(12) United States Patent
Mobbs et al.

(10) Patent No.: US 11,682,834 B2
(45) Date of Patent: Jun. 20, 2023

(54) DIFFERENTIAL TIME DELAY SHIFTER INCLUDING A 1-N SWITCH AND TRANSMISSION LINES CONFIGURED TO PROVIDE ADJUSTABLE DELAY SHIFT

(71) Applicant: Menlo Microsystems, Inc., Irvine, CA (US)

(72) Inventors: Christopher Ian Mobbs, Harrogate (GB); Marten A. E. Seth, Dana Point, CA (US)

(73) Assignee: Menlo Microsystems, Inc., Irvine, CA (US)

( * ) Notice: Subject to any disclaimer, the term of this patent is extended or adjusted under 35 U.S.C. 154(b) by 55 days.

(21) Appl. No.: 17/124,469

(22) Filed: Dec. 16, 2020

(65) Prior Publication Data
US 2021/0273330 A1    Sep. 2, 2021

Related U.S. Application Data

(60) Provisional application No. 62/949,152, filed on Dec. 17, 2019.

(51) Int. Cl.
   *H01Q 3/26* (2006.01)
   *H01P 1/18* (2006.01)
   *H04W 16/28* (2009.01)

(52) U.S. Cl.
   CPC ............ *H01Q 3/2694* (2013.01); *H01P 1/18* (2013.01); *H01P 1/184* (2013.01); *H04W 16/28* (2013.01)

(58) Field of Classification Search
   CPC .... H01P 9/00; H01P 1/18; H01P 1/184; H01P 1/10; H01Q 3/36

USPC .......................................................... 333/161
See application file for complete search history.

(56) References Cited

U.S. PATENT DOCUMENTS

| 5,783,975 A * | 7/1998 | Nakamura | H01P 1/10 333/101 |
| 2008/0188229 A1 | 8/2008 | Melis | |

OTHER PUBLICATIONS

International Search Report and Written Opinion for PCT/US2020/065420 dated Apr. 22, 2021 titled "Differential Time Delay Shifter Apparatus and Method".

* cited by examiner

*Primary Examiner* — Benny T Lee
(74) *Attorney, Agent, or Firm* — Hamilton, Brook, Smith & Reynolds, P.C.

(57) ABSTRACT

A differential time delay shifter may comprise a 1-to-N switch, where N is an integer greater than 1. The switch may have a pole contact, N throw contacts, and a pole arm to selectively couple the pole contact to one of the throw contacts. One throw contacts may be a first throw contact at a first switch position, and one throw contacts may be a last throw contact at a last switch position. The shifter may further comprise one or more transmission lines, each of which is electrically connected between two of the N throw contacts. The shifter may further comprise a source configured to generate an electromagnetic signal. The source may be electrically coupled to the pole contact, to convey the signal to the pole contact. The shifter may further comprise one or more loads, a first of which is electrically coupled to the first throw contact.

19 Claims, 12 Drawing Sheets

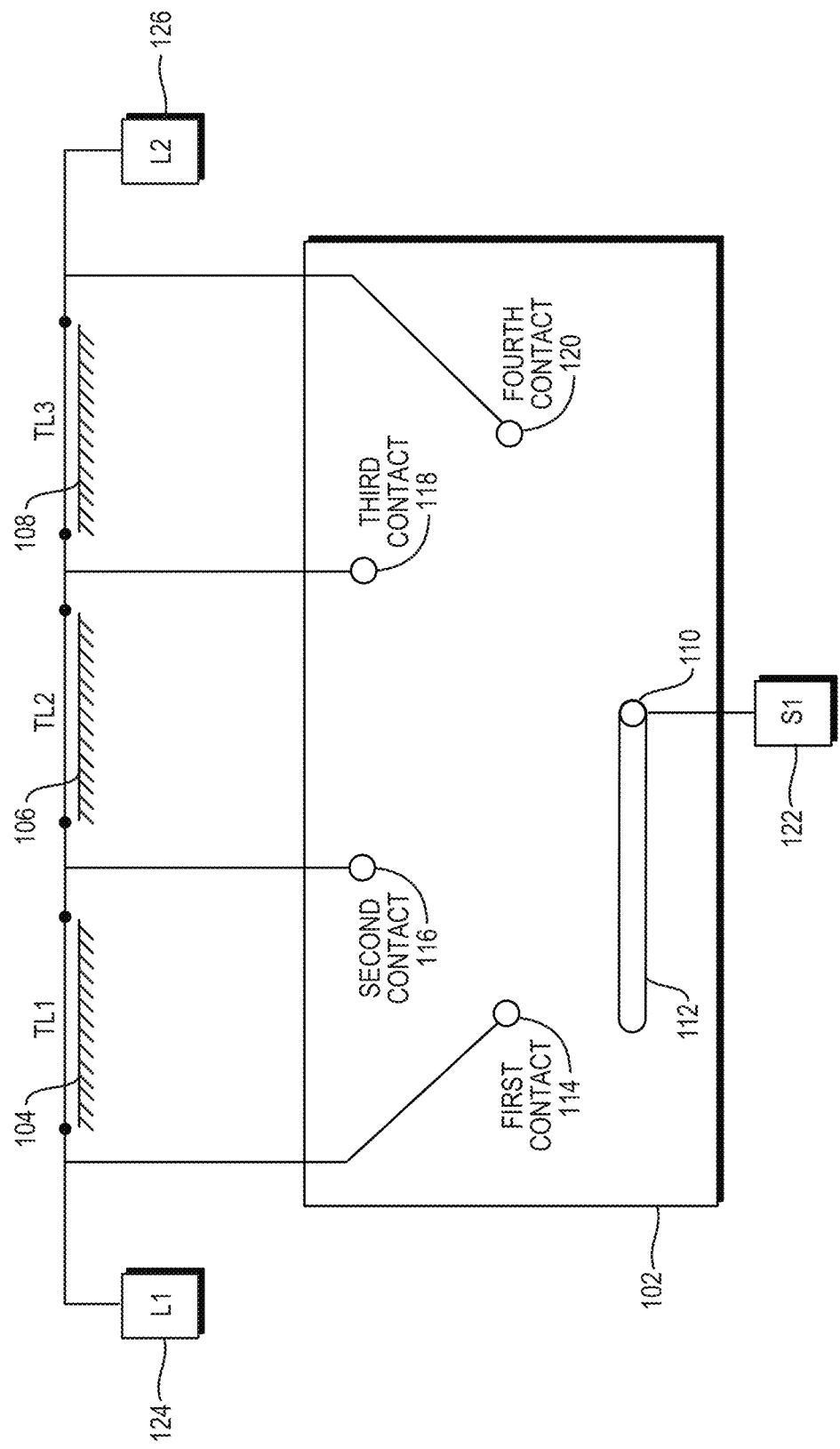

DIFFERENTIAL TIME DELAY SHIFTER INCLUDING A 1-N SWITCH AND TRANSMISSION LINES CONFIGURED TO PROVIDE ADJUSTABLE DELAY SHIFT

RELATED APPLICATION

This application claims the benefit of U.S. Provisional Application No. 62/949,152, filed on Dec. 17, 2019. The entire teachings of the above application are incorporated herein by reference.

BACKGROUND

In a cellular communications system, interference between base stations of neighboring cells needs to be minimized to facilitate frequency reuse between cells. Radiation pattern control of the base station transmitter is one way to reduce such inter-cell interference. For example, one way to reduce the interference between cell sites is to decrease a cell site's coverage area by tilting the antenna's vertical (elevation) pattern downwards towards the ground. While this may be accomplished by mechanically tilting the antenna downwards with adjustable brackets, the tilt may alternatively be accomplished by steering the transmission beam downwards using the phased array antenna configuration.

A phased array antenna may be used to directionally steer a beam of electromagnetic (EM) radiation. A prior art example of a phased array antenna system is shown in FIG. 1. An array of antenna elements 12 is driven by a transmitter 14. The feed current for each antenna element passes through a phase shifter 16. When the phase shift implemented by the phase shifters 16 are all the same, the transmissions from the array of antenna elements 16 combine to form a wavefront 18 that is perpendicular to the antenna axis 20. If the phase shift of the phase shifters 16 is progressively increased across the array (e.g., from top to bottom of the array in FIG. 1), the transmissions from the array of antenna elements 16 combine to form a wavefront 22 that is directed at an angle θ with respect to the antenna axis 20. With the example one-dimensional array of antenna elements 16, the transmitted EM beam may be steered within a single plane (e.g., the vertical plane) by varying the phase shift provided by each of the phase shifters 16.

The angle θ of the antenna beam may be changed by changing the phase shift of each individual phase shifter 16. FIG. 2 shows a prior art example of a variable phase shifter 28 that may be used for this purpose. The variable phase shifter 28 consists of a wiper arm 36 that is rotatable about a pivot coupler 38 so that the distal end of the wiper arm scans an arc shaped conductive strip 40. The coupling between the distal end of the wiper arm 36 and the conductive strip 40 is capacitive. When the wiper arm 36 is rotated about the pivot coupler 38, the path length changes between a first port 30 and a second port 32, and between the first port 30 and a third port 34, which varies the phase of signals outputs at the second port 32 and the third port 34.

Because the phase shifter 28 depicted in FIG. 2 is a slider mechanism, the wiper arm 36 needs to be physically moved (e.g., rotated) to change the phase at the output ports. In order to make the phase shifter of FIG. 2 remotely controllable, a stepper motor or other such driving mechanism needs to be associated with the wiper arm of the phase shifter. The mechanical nature of the phase shifter 28 and an associated stepper motor may introduce adverse reliability and performance issues into the transmitter/antenna system.

SUMMARY OF THE INVENTION

In one aspect, the invention may be a differential time delay shifter comprising a 1-to-N switch, where N is an integer greater than 1. The 1-to-N switch may have a pole contact, N throw contacts, and a pole arm configured to selectively electrically couple the pole contact to zero or more of the N throw contacts. One of the N throw contacts may be a first throw contact at a first position of the 1-to-N switch, and another one of the N throw contacts may be a last throw contact at a last position of the 1-to-N switch. The differential time delay shifter may further comprise one or more transmission lines, each transmission line is electrically connected between two of the N throw contacts. The differential time delay shifter may further comprise a source configured to generate an electromagnetic (EM) signal. The source may be electrically coupled to the pole contact to convey the EM signal to the pole contact. The differential time delay shifter may further comprise one or more loads, a first of which is electrically coupled to the first throw contact.

In one embodiment, a second of the one or more loads may be electrically coupled to the last throw contact. A switch position of the 1-to-N switch may cause (i) the EM signal to propagate through M of the one or more transmission lines to the first load, and (ii) the EM signal to propagate through N-M of the one or more transmission lines to the second load, M being an integer greater than or equal to zero. The M transmission lines may be different from the N-M transmission lines. The pole arm may be configured to selectively electrically couple the pole contact to only one of the N throw contacts at a time. The pole arm may be configured to selectively electrically couple the pole contact to two or more of the N throw contacts simultaneously. The pole arm may be configured to selectively electrically couple the pole contact to (i) none of the N throw contacts, (ii) only one of the N throw contacts at a time, or (iii) two or more of the N throw contacts simultaneously.

The differential time delay shifter may further comprise one or more matching components configured to match an impedance of one of the switch, the load, the source, and the one or more transmission lines, to an impedance of another of the switch, the load, the source, and the one or more transmission lines.

In another aspect, a method of applying a time delay to an electromagnetic (EM) signal may comprise configuring a 1-to-N switch, where N is an integer greater than 1, to have (i) a pole contact, (ii) N throw contacts, (iii) a pole arm configured to selectively electrically couple the pole contact to one of the N throw contacts, one of the N throw contacts being a first throw contact at a first position of the 1-to-N switch and another one of the N throw contacts being a last throw contact at a last position of the 1-to-N switch, and (iv) one or more transmission lines, each transmission line is electrically connected between two of the N throw contacts. The method may further comprise electrically coupling a source configured to generate the electromagnetic (EM) signal to the pole contact, electrically coupling a first load to the first throw contact, and manipulating the pole arm to electrically couple the pole contact to one of the N throw contacts.

The method may further comprise electrically coupling a second load to the last throw contact. The method may further comprise causing the EM signal to propagate through M of the one or more transmission lines to the first load, and cause the EM signal to propagate through N-M of the one or more transmission lines to the second load, M being an integer greater than or equal to zero. The method may further comprise selectively electrically coupling the pole contact to only one of the N throw contacts at a time. The method may also comprise selectively electrically coupling the pole contact to two or more of the N throw contacts simultaneously. The method may alternatively comprise selectively electrically coupling the pole contact to (i) none of the N throw contacts, (ii) only one of the N throw contacts at a time, or (iii) two or more of the N throw contacts simultaneously.

In yet another aspect, an antenna array feed system may comprise an antenna array having at least one column of radiating elements, and at least one delay shift network configured to distribute an electromagnetic (EM) signal to the antenna array. The at least one delay shift network may comprise at least one 1-to-N switch, and one or more transmission lines, each of which is electrically connected between two of N throw contacts of the 1-to-N switch. Each of the radiating elements of the antenna array may be electrically coupled to a throw contact of the at least one 1-to-N switch, such that each radiating element is disposed at an end point of the one or more transmission lines.

In an embodiment, the 1-to-N switch may be configured to selectively electrically couple the EM signal to only one of the N throw contacts at a time. The 1-to-N switch may be configured to selectively electrically couple the EM signal to two or more of the N throw contacts simultaneously. The 1-to-N switch may be configured to selectively electrically couple the EM signal to (i) none of the N throw contacts, (ii) only one of the N throw contacts at a time, or (iii) two or more of the N throw contacts simultaneously.

The antenna array may comprise at least two columns of radiating elements. The at least one delay shift network may be configured to distribute the EM signal to radiating elements of the at least two columns such that the elements of each column experiences a same differential delay pattern. The antenna array may comprise at least two columns of radiating elements. The at least one delay shift network may be configured to distribute the EM signal to radiating elements of the at least two columns such that the elements of each column experience different differential delay patterns.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 3A, 3B, and 3C show example embodiments of a differential delay shifter according to the invention.

DETAILED DESCRIPTION OF THE INVENTION

A description of example embodiments follows.

The described embodiments are directed to a differential true time delay shifter that may provide discrete time delay paths from an electromagnetic (EM) signal source to a load.

Figure 3A:
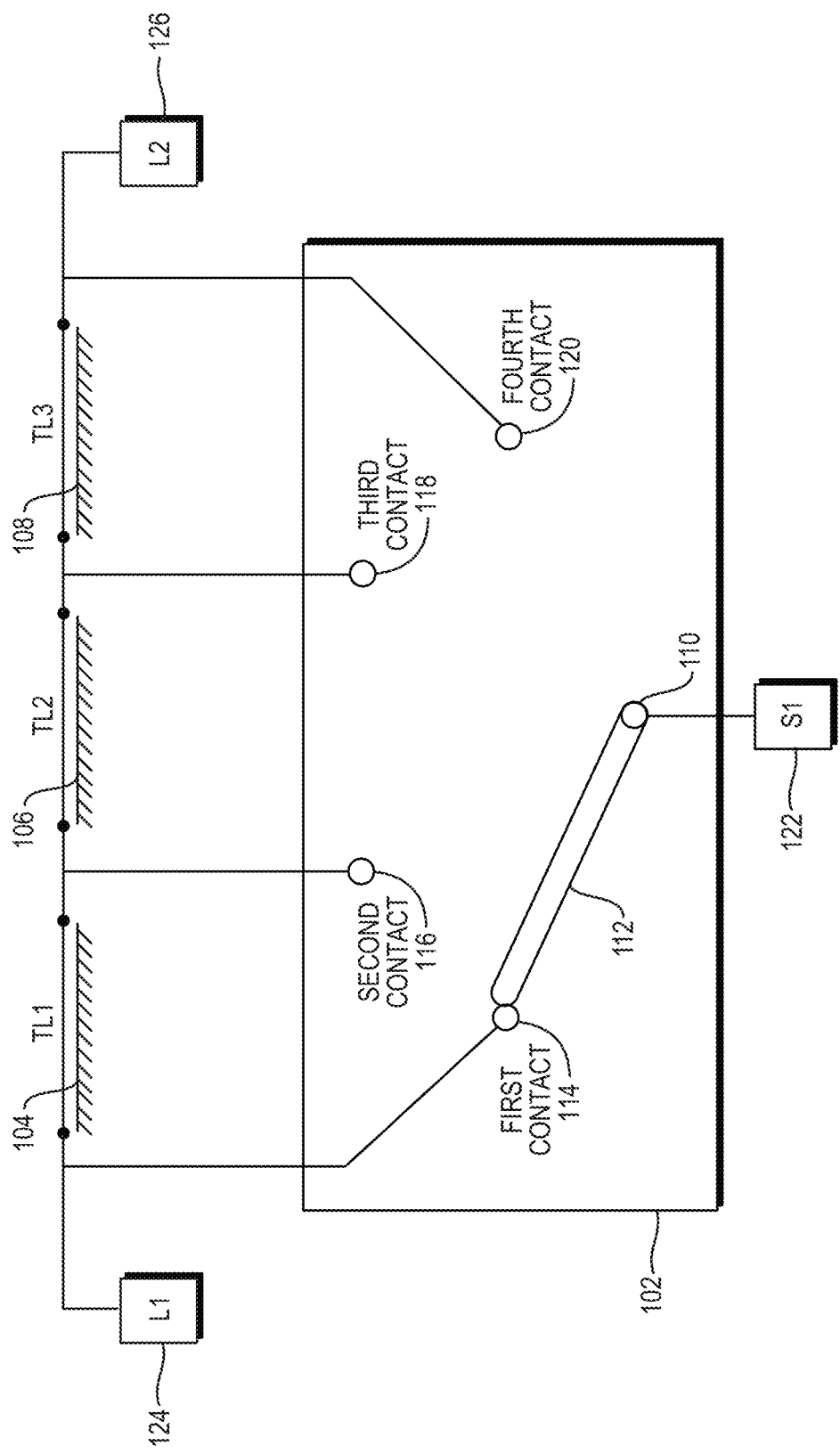

FIG. 3A shows an example embodiment of a differential delay shifter according to the invention, which comprises a single-pole, four-throw switch 102, a first transmission line 104, a second transmission line 106, and a third transmission line 108. The switch 102 may comprise a pole 110 electrically coupled to a pole arm 112, which is configured to selectively couple (electrically) the pole 112 to one of a first contact 114, a second contact 116, a third contact 118, and a fourth contact 120. The first transmission line 104 (TL1) is electrically coupled between the first contact 114 and the second contact 116. The second transmission line 106 is electrically coupled between the second contact 116 and the third contact 118. The third transmission line 108 is electrically coupled between the third contact 118 and the fourth contact 120. A source 122 (S1) is electrically coupled to the pole 110, a first load (L1) 124 is electrically coupled to the first contact 114, and a second load (L2) 126 is electrically coupled to the fourth contact 120.

When the switch 102 electrically couples the pole 110 to the first contact 114, a transmission path exists (i) from the source 122 directly to the first load 124, and (ii) from the source 122 to the second load 126 through transmission lines TL1 104, TL2 106, and TL3 108.

When the switch 102 electrically couples the pole 110 to the second contact 116, a transmission path exists (i) from the source 122 to the first load 124 through transmission line TL1 104, and (ii) from the source 122 to the second load 126 through transmission lines TL2 106 and TL3 108.

When the switch 102 electrically couples the pole 110 to the third contact 116, a transmission path exists (i) from the source 122 to the first load 124 through transmission lines TL1 104 and TL2 106, and (ii) from the source 122 to the second load 126 through transmission line TL3 108.

When the switch 102 electrically couples the pole 110 to the fourth contact 120, a transmission path exists (i) from the source 122 to the first load 124 through transmission lines TL1 104, TL2 106, and TL3 108, and (ii) from the source 122 directly to the second load 126.

By setting the switch 102 to one of the four states described above, the transmission path from source 122 to the first load 124 may be configured to be one of direct from source 122, through TL1, through TL1+TL2, or through TL1+TL2+TL3, and the transmission path from source 122 to the second load 126 may be configured to be one of direct from source 122, through TL3, through TL2+TL3, or through TL1+TL2+TL3. Each transmission line TL1 104, TL2 106 and TL3 108 implements a time delay of the signal propagating through the transmission line. The delay is equal to the length of the transmission line divided by the propagation velocity of the signal through the transmission line. The resulting phase delay of the propagating signal depends on the frequency (wavelength) of the signal. For example, a transmission line that is 24 mm (0.024 m) produces a time delay of 0.024 m/(3×10$^8$ m/s)=80 ps, assuming the propagation velocity is c=3×10$^8$. For a 2 GHz propagating signal, with a period of 0.5 ns, a time delay of 80 ps corresponds to a phase delay of approximately 58 degrees. The time delay resulting from a particular set of switch-selected transmission paths thus produces a corresponding phase delay. The switch 102 may feature a fifth state, in which the pole is electrically coupled to none of the throw contacts, and the pole is electrically isolated from the throw contacts.

The example above is presented to describe concepts of the invention, and is not intended to be limiting. Embodiments of the invention may utilize any number of throws (e.g., a single pole, N throw switch, where N is an integer). The transmission lines (e.g., TL1, TL2, TL3) between throw contacts of the switch may be any length and are not necessarily equal. The lengths of the transmission lines may be chosen as appropriate to implement a desired propagation delay for a particular switch setting. Additional transmission line segments (matching segments) may be included in the differential delay shifter to provide for impedance matching (i) between transmission lines, (ii) from the switch 102 to the transmission lines, (iii) from the source to the switch, and (iv) from the transmission lines to the loads. The matching segments may add length to the transmission path from the source 122 to the loads 124, 126, which, as described above, corresponds to an increase in the phase delay at the load.

Referring to the example embodiment described above with respect to FIG. 3, suppose the length of TL1=the length of TL2=the length of TL3=24 mm, and the signal driven by S1 has a frequency in the range 0 to 4 GHz. When the switch 112 connects the pole 110 to the first contact 114, the time delay difference between the signal at S1 122 and L1 124 would be 0pS, and the time difference between the signal at S1 122 and L2 126 would be approximately 240 pS. When the switch 102 connects the pole 110 to the second contact 114, the time difference between the signal at S1 122 and L1 124 would be approximately 80 pS, and the time difference between the signal at S1 122 and L2 126 would be approximately 160 pS. When the switch 102 connects the pole 110 to the third contact 116, the time difference between the signal at S1 122 and L1 124 would be approximately 160 pS, and the time difference between the signal at S1 122 and L2 126 would be approximately 80 pS. When the switch 102 connects the pole 110 to the fourth contact 118, the time difference between the signal at S1 122 and L1 124 would be approximately 240 pS, and the time difference between the signal at S1 122 and L2 126 would be approximately 0pS. The example implementation embodiment described above is summarized in Table 1.

TABLE 1

| Switch Position | Time Delay at L1 (w.r.t. S1) | Time Delay at L2 (w.r.t. S1) |
| --- | --- | --- |
| First contact | 0 pS | 240 pS |
| Second contact | 80 pS | 160 pS |
| Third contact | 160 pS | 80 pS |
| Fourth contact | 240 pS | 0 pS |

Figure 4:
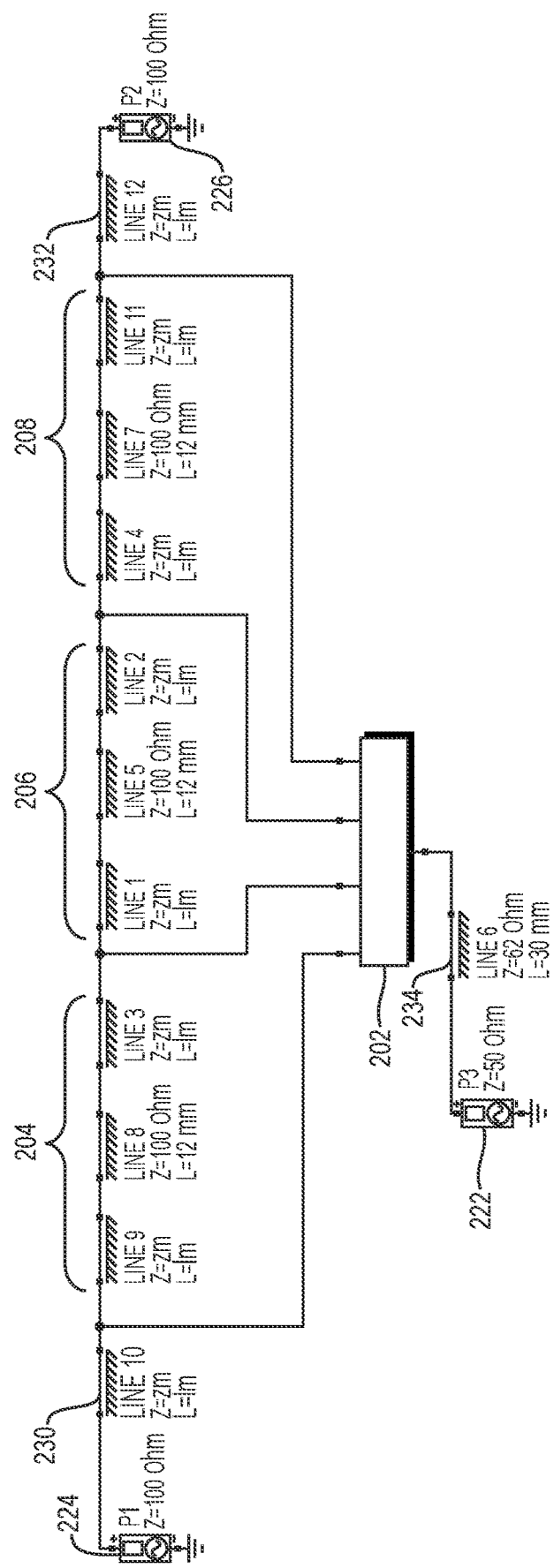
FIG. 4 illustrates an example simulation model of a differential delay shifter according to the invention.

FIG. 4 illustrates an example simulation model a differential delay shifter comprising a 1-pole, 4-throw switch 202 distributing a signal from a source P3 222 to a first load P1 224 and a second load P2 226. Although the first and second loads 224, 226 in this example embodiment are depicted as being a Z=100 ohm impedance loads, and the source 222 is depicted as being a 50 ohm impedance load, these specific values are examples only and are not intended to be limiting. The switch 202 in this example simulation model is a Menlo Microsystems, Inc., MM5130 switch, which features a single pole, 4 throw switching facility. A first transmission line 204 comprises a L=12 mm, Z=100 ohm transmission line (line8), and two matching segments (Line9 and Line3), each having an impedance of Z=zm (matching impedance) and a length of L=lm (matching length). A second transmission line 206 comprises a L=12 mm, Z=100 ohm transmission line (line5), and two matching segments (Line1 and Line2, each having an impedance of Z=zm and a length L=1 m). A third transmission line 208 comprises a L=12 mm, Z=100 ohm transmission line (line7), and two matching segments (Line4 and Line11, each having an impedance of Z=zm and a length L=1 m). A matching segment 230 (Line 10) matches the first load 224 to the first segment 204 and to the switch 202. A matching segment 232 (Line 12) matches the second load 226 to the third segment 208 and to the switch 202. A matching segment 234 comprises a L=30 mm, Z=62 ohm (Line 6) matches the source 222 to the switch 202.

Figure 5A:
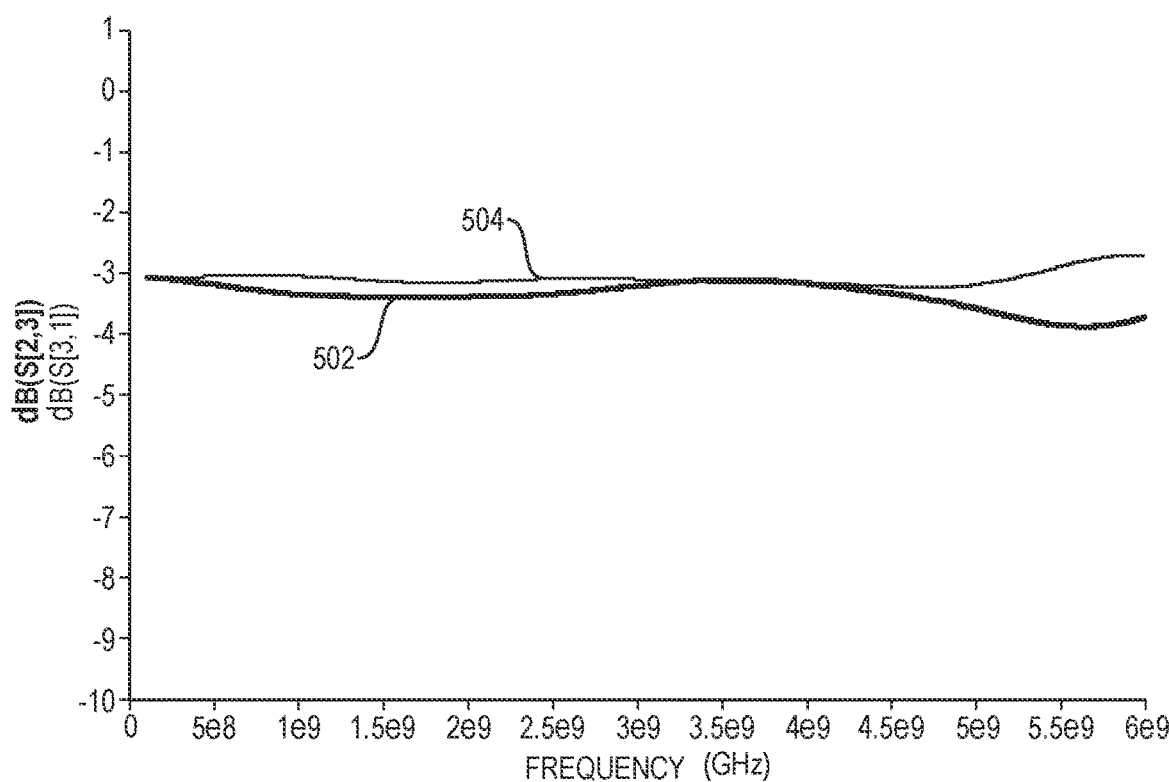
FIGS. 5A and 5B illustrate simulation results associated with the simulation model shown in FIG. 4.
Figure 5B:
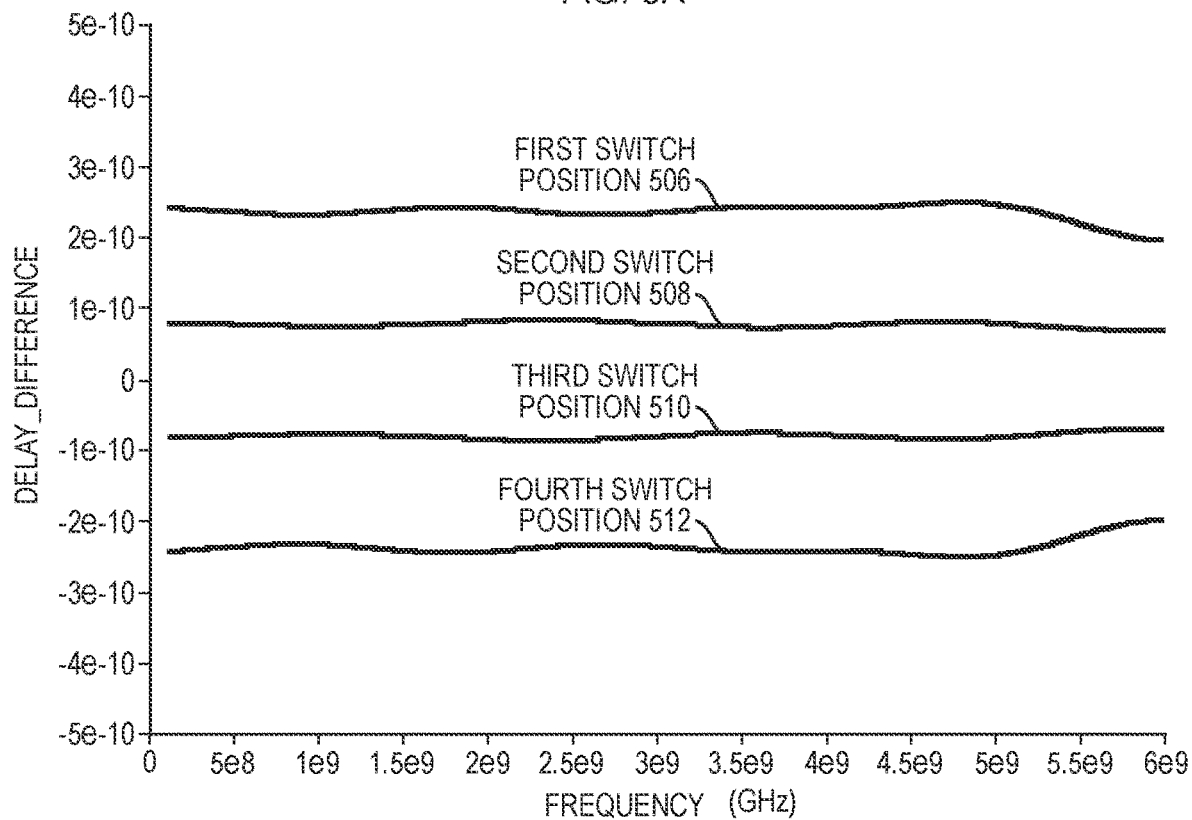

FIGS. 5A and 5B illustrate simulation results associated with the simulation model shown in FIG. 4. FIG. 5A shows the transmission loss 502 between the source 222 and the first load 224 (dB(S[2,3])) and the transmission loss 504 between the source 222 and the second load 226 (dB(S[3,1])) as a function of frequency, showing close to an even split (3 dB) of power. FIG. 5B shows the time delay difference between the first load 224 and the second load 226, as a function of frequency, for each of the first to fourth switch positions 506, 508, 510, and 512 respectively.

Figure 1:
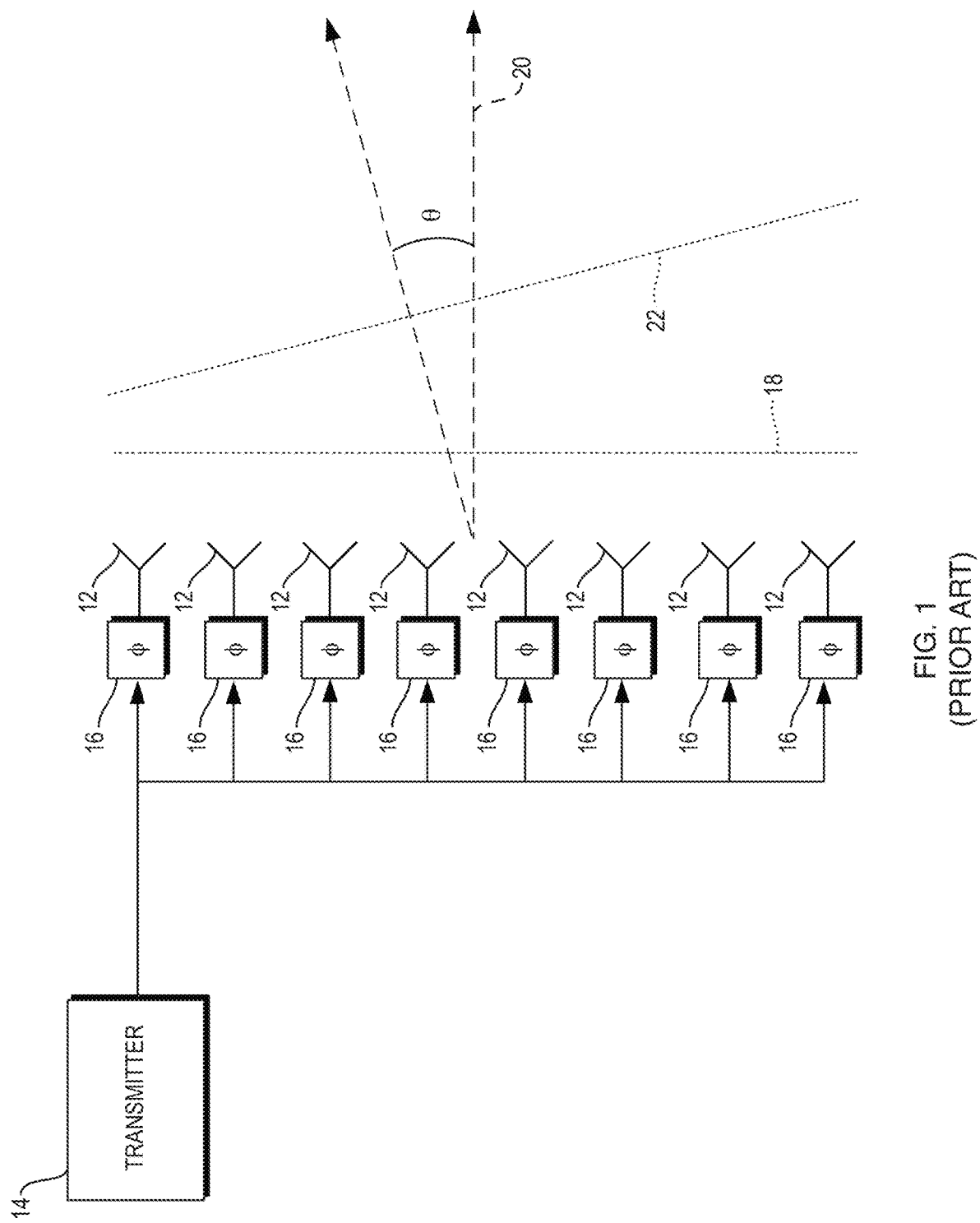
FIG. 1 shows a prior art example of a phased array antenna system.
Figure 2:
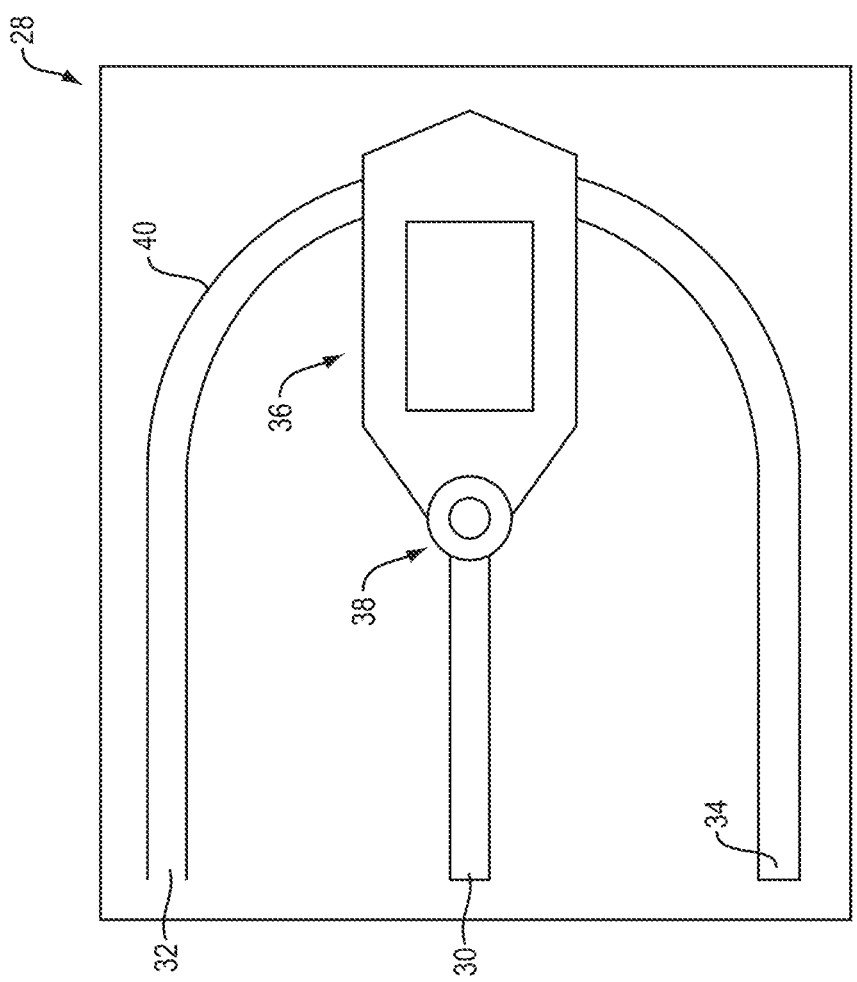
FIG. 2 shows a prior art example of a variable phase shifter.

The described embodiments are directed to a discrete or quantized version of the wiper arm phase shifter described with respect to FIG. 2. The described embodiments, however, provide substantially improved performance at high frequencies (e.g., greater than 1 GHz).

Figure 6A:
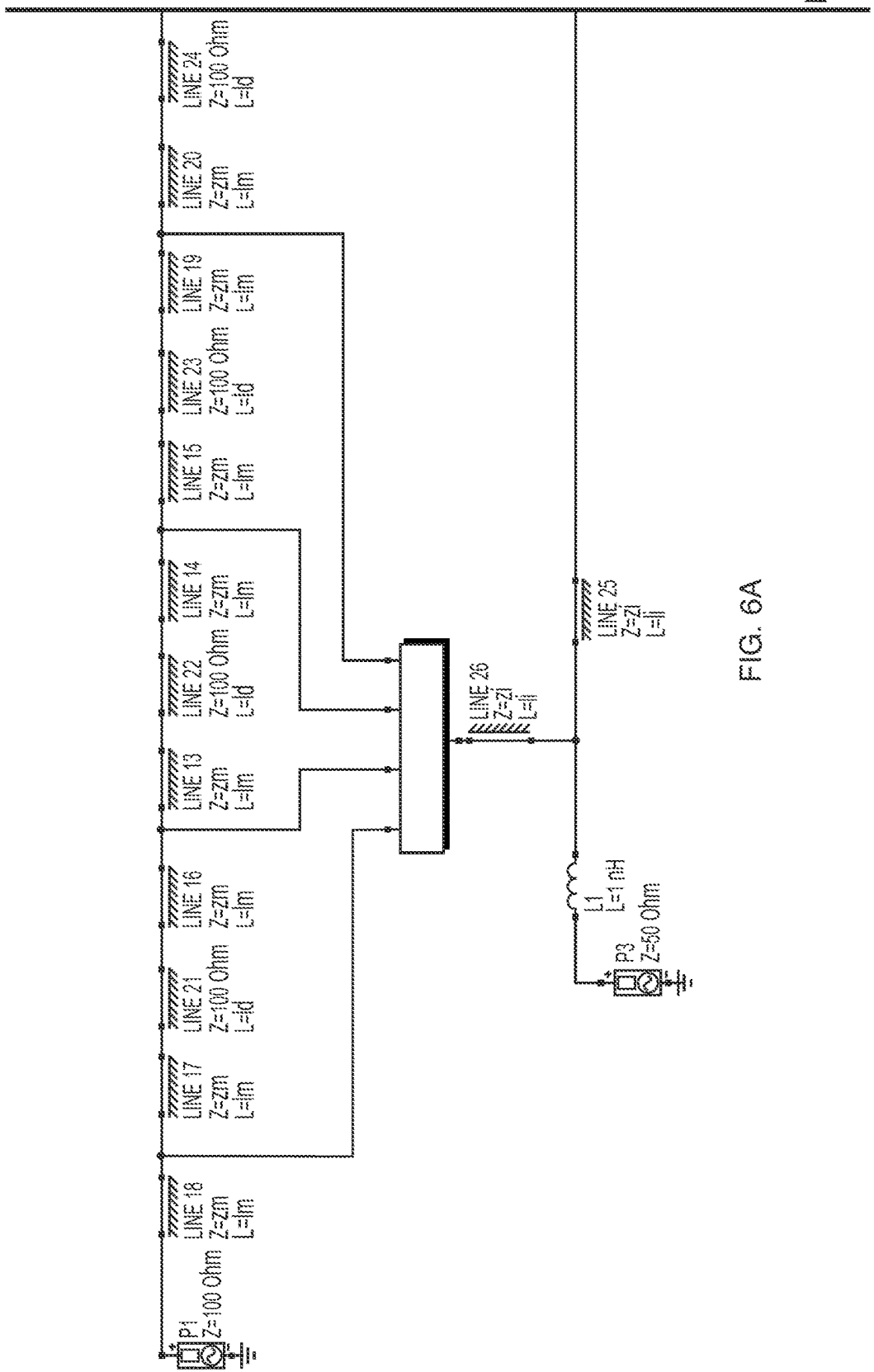
FIGS. 6A through 6D illustrate an alternative embodiment of a differential delay shifter according to the invention.
Figure 6B:
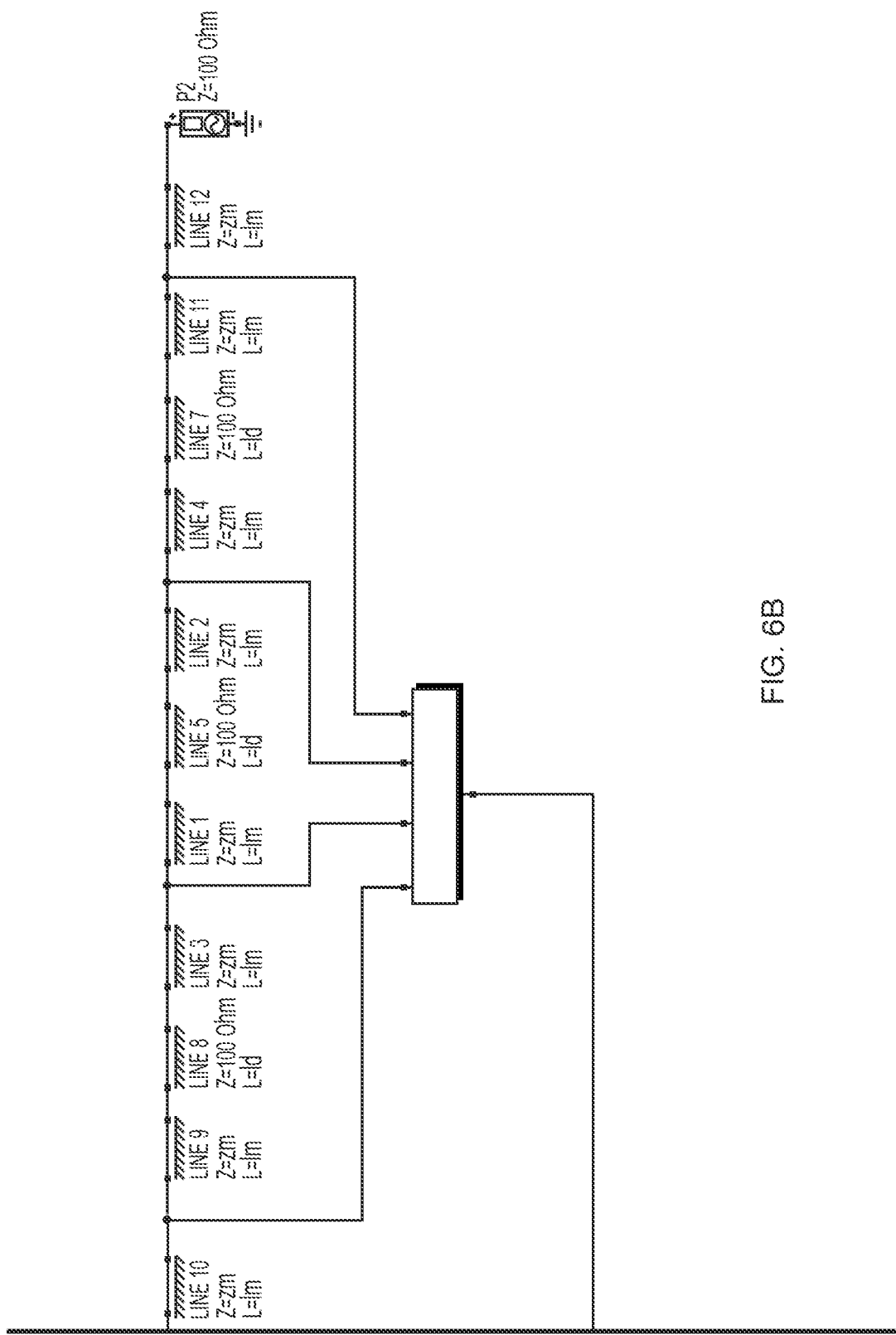
Figure 6C:
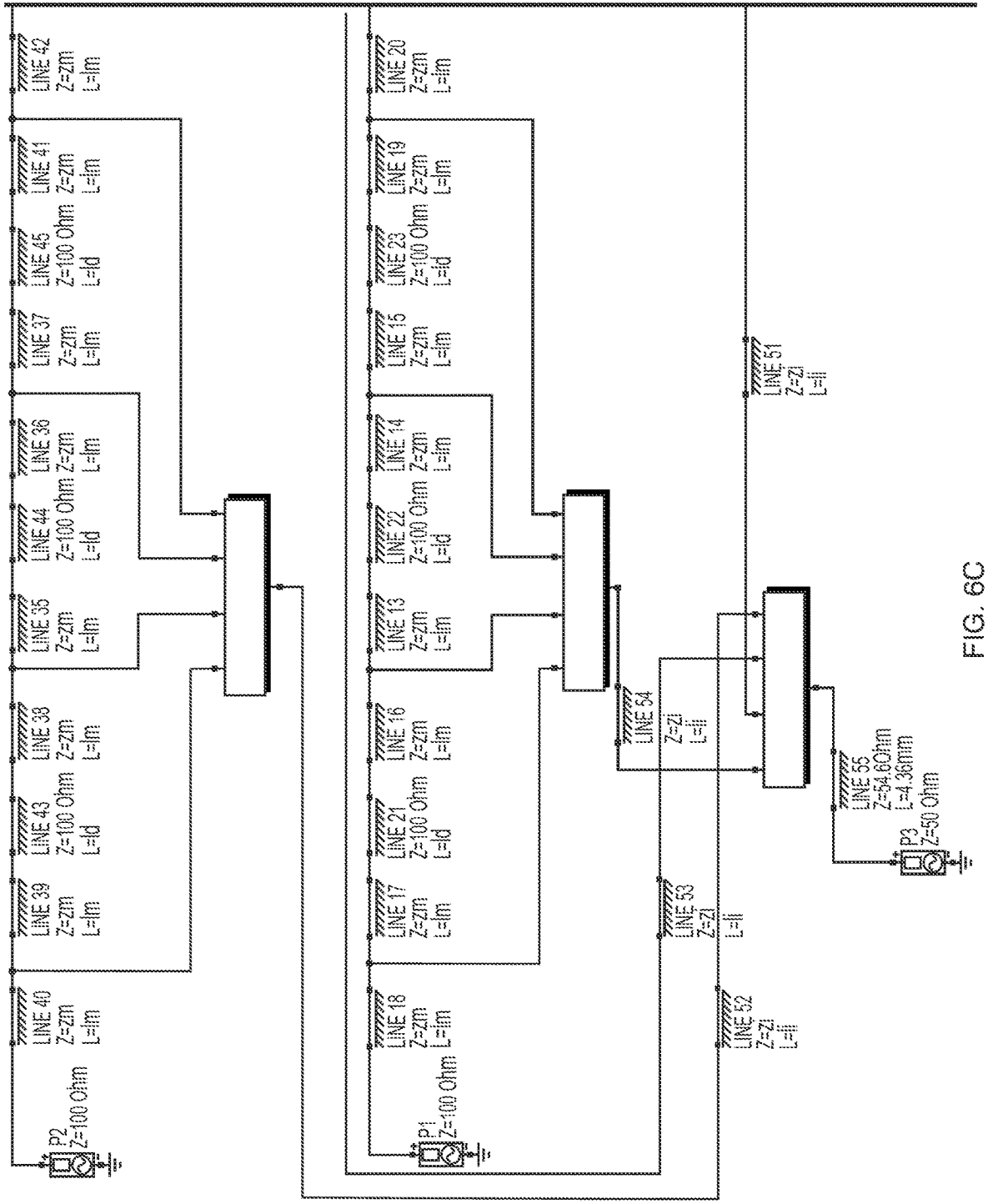
Figure 6D:
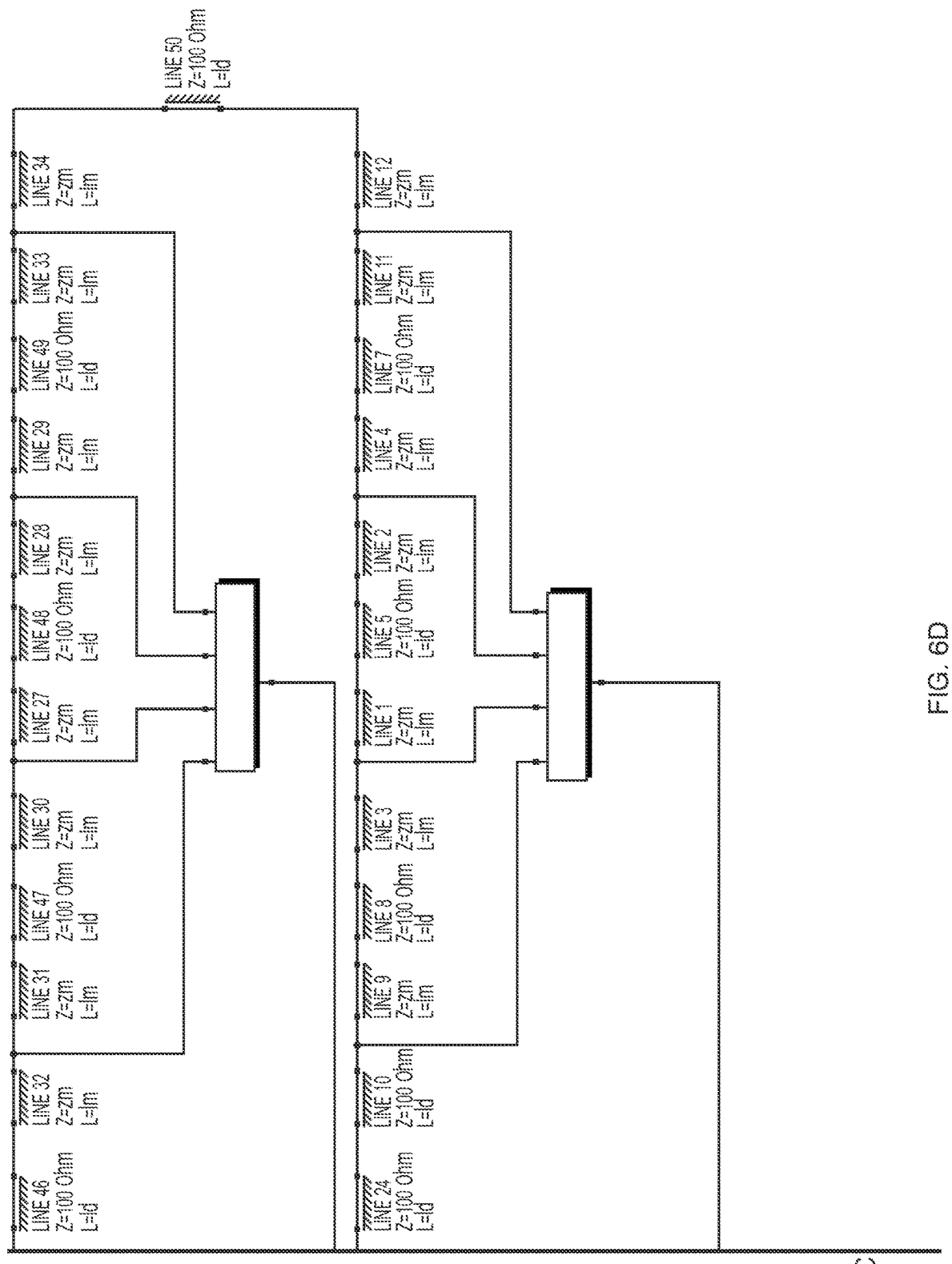

Smaller switches (e.g., the 1-pole, 4-throw switch used in the example embodiments shown in FIGS. 3A-3C and 4) may be combined to form larger switches, as shown in the example embodiments of FIGS. 6A through 6D, although a single switch device with higher numbers of throw contacts (e.g., 8, 16, or 32 throw contacts) may alternatively be used. FIGS. 6A and 6B show two 1-pole, 4-throw switches combined to effectively form a 1-pole, 8-throw switch with a correspondingly greater number of transmission lines (i.e. lines 13-26), which increases the number phase delays that can be selected. Similarly, 6C and 6D show four 1-pole, 4-throw switches combined to effectively form a 1 pole, 16-throw switch including a greater number of transmission lines (i.e. lines 27-55). Configurations such as those shown in the example embodiments of FIGS. 6A through 6D require that each individual switch be capable of a fifth "no contact" state that isolates the pole contact from any of the throw contacts, so that at any given time only one switch is active and electrically connects its pole contact to a throw contact.

While some embodiments, as described above, may provide for only one switch being active at a given time, alternative embodiments may exploit a system benefit to closing more than one switch at a given time (as shown, for example, in FIG. 3C), which may produce additional phase states not available when only one switch is active. Similarly, a configuration where no switches are active (as shown, for example, in FIG. 3B) may disconnect the antenna elements, thereby producing new antenna patterns not available when at least one element is connected to a transmission source.

While the discrete (i.e., quantized) version of the phase shifter described herein may be used to implement more than one switch activation as described above, an actual wiper arm phase shifter cannot facilitate an analogous state. In other words, the prior-art wiper arm phase shifter can only implement one wiper position at a time, which corresponds to one switch activation of the described embodiment of a discrete phase shifter. The mechanical, wiper arm phase shifter cannot contact two points on the delay line at the same time. Accordingly, the implementation of more than one switch of the discrete phase shifter was not, and could not, be contemplated in the prior art.

Figure 3C:
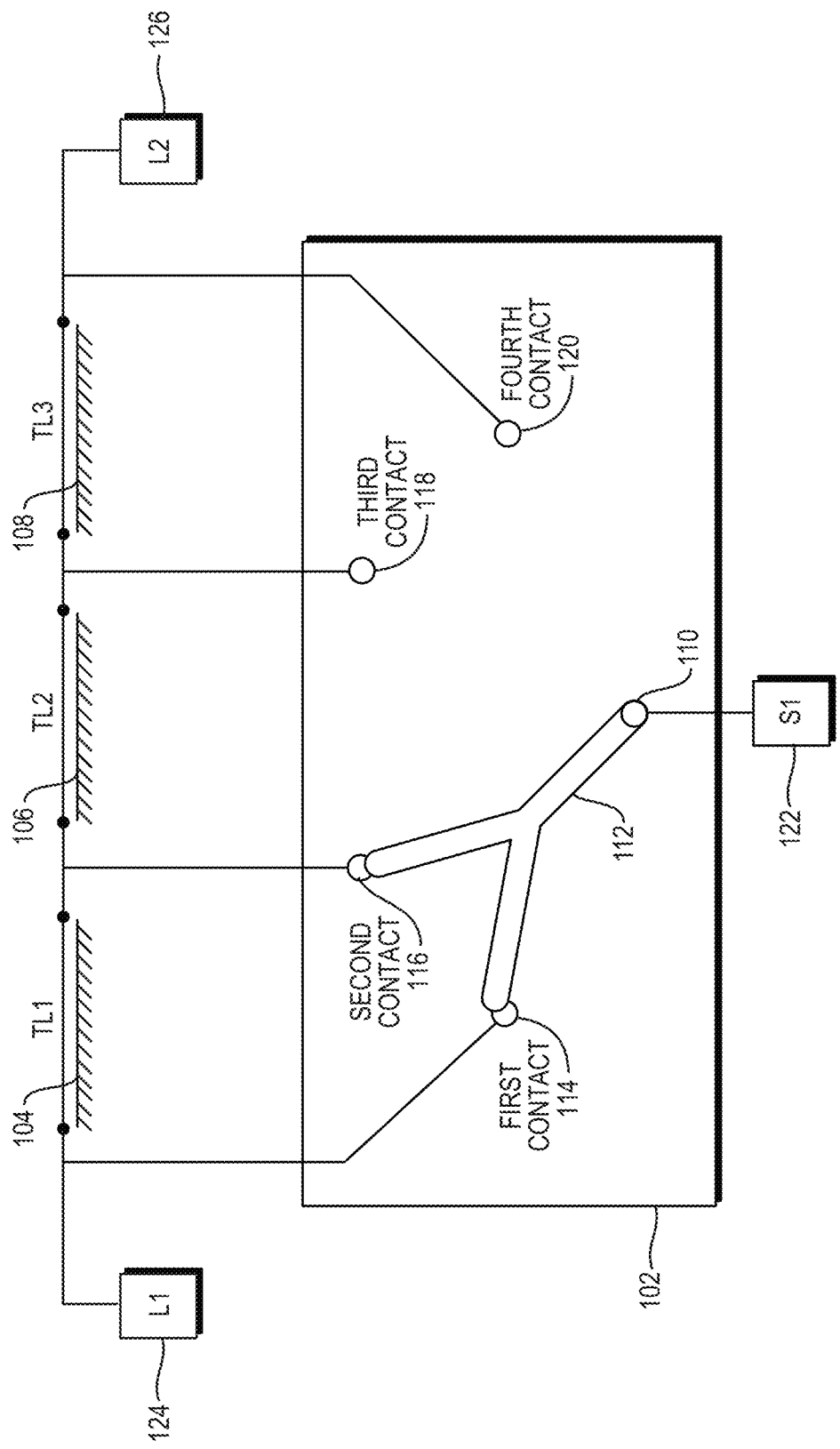

As shown in FIG. 3C, closing two switch paths simultaneously connects two adjacent nodes of the transmission line together. The section of transmission line between these nodes then becomes a parasitic element in the circuit. This may be considered as an open circuit stub line which has a length of half the loop between the adjacent nodes and an impedance Zo/2 where Zo is the impedance of the through transmission line. As long as the length of the delay loop is approximately one quarter wavelength or less (corresponding to a phase step of 90 degrees), then the parasitic effect of the open circuit stub may easily be tuned out. For phase steps of greater than 90 degrees, the effectiveness of this technique is compromised. In practice this is not a significant limitation as the phase steps would generally be less than 90 degrees.

Figure 7:
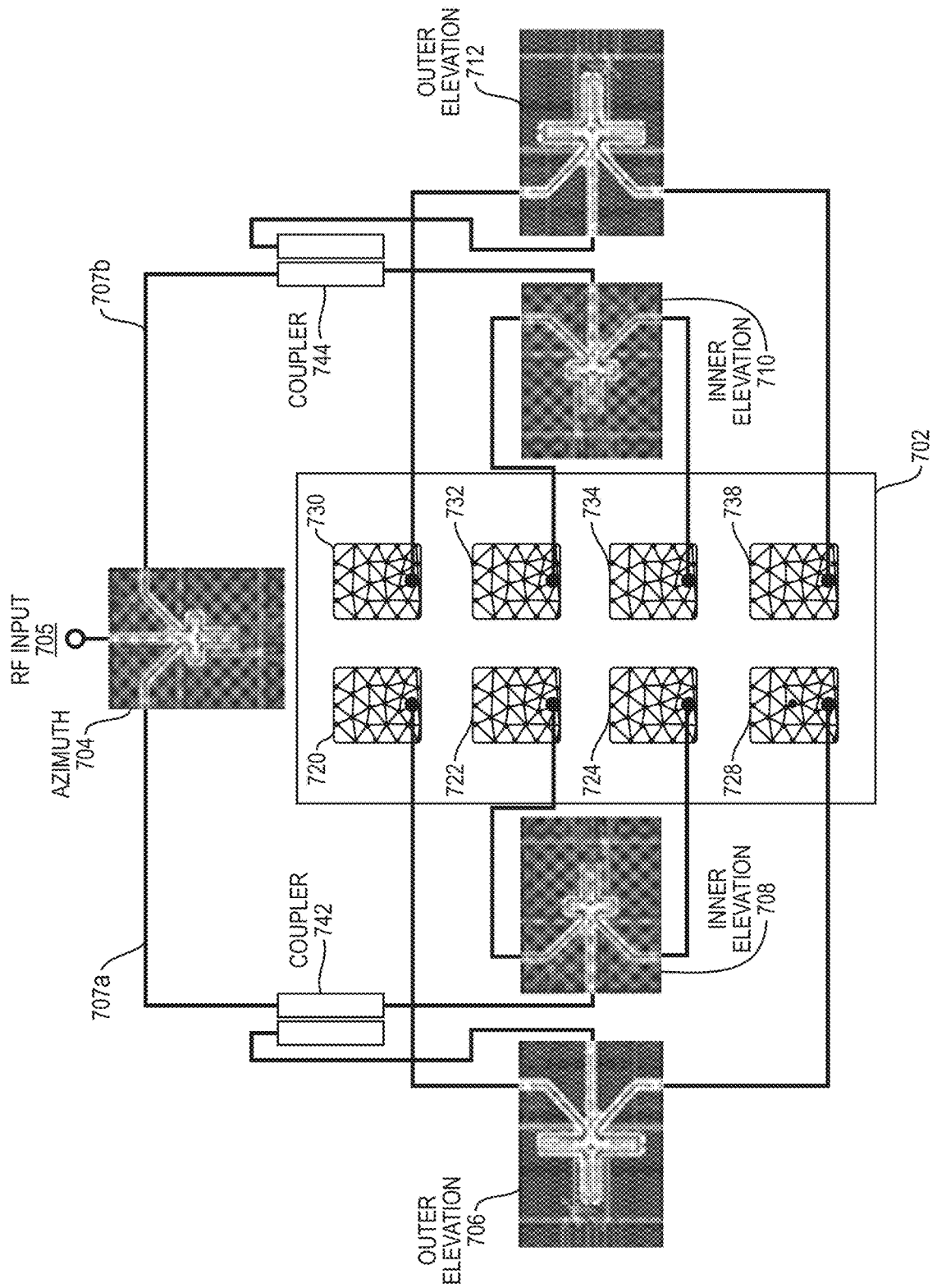
FIG. 7 shows an example cascaded network of delay shifts that may be used to steer two axes of a multi element array.

The differential delay shift network as described herein is not limited to providing adjustment or beam steering in a single axis of an array of antenna elements. As shown in the example embodiment of FIG. 7, a cascaded network of delay shifts may be used to steer two axes of a multi element array 702 that has two columns of four elements each. In this embodiment, both azimuth and elevation are adjusted. The first delay shift network 704 allows the relative signal delay, which feeds individual columns of elements, to be controlled, thereby providing azimuth beam steering. Within each column, additional delay shift networks, driven by the RF signal input 705, provide the elevation beam steering. The first output RF signal 707a from the first delay shift network 704 is provided to a first coupler 742, which splits the first output RF signal 707a and distributes versions of that signal to the first outer elevation delay shift network 706 and the first inner elevation delay shift network 708. The second output RF signal 707b from the first delay shift network 704 is provided to a second coupler 744, which splits the second output RF signal 707b and distributes versions of that signal to the second outer elevation delay shift network 712 and the second inner elevation delay shift network 710.

In the example embodiment that has four radiating elements in each column, each column comprises two outer elements (e.g., element 720 and element 728 in the first column, and element 730 and element 738 in the second column), and two inner elements (e.g., element 722 and element 724 in the first column, and element 732 and element 734 in the second column). A first outer elevation delay shift network 706 drives the two outer elevation elements 720, 728 in the first column, and a second outer elevation delay shift network 712 drives the two outer elevation elements 730, 738 in the second column. Similarly, a first inner elevation delay shift network 708 drives the two inner elevation elements 722, 724 in the first column, and a second inner elevation delay shift network 710 drives the two outer elevation elements 732, 734 in the second column.

Typically, the individual columns would be controlled to the experience the same differential delay, but the columns could be set to different elevations, depending on the required radiation pattern, by adjusting the delay shifters individually.

Example embodiments of the invention may implement the switch 102 as shown in FIG. 3 with a Micro-Electro-Mechanical System (MEMS) switch having low parasitic, all series switch elements (e.g., the MM5130 switch described herein). Such a MEMS switch makes the implementation of the circuit significantly simpler than using more conventional solid-state switches incorporating shunt circuit elements. Although the use of a MEMS switch may provide certain advantages, the example use of such a MEMS switch-based architecture is not intended to be limiting.

The switch-based embodiments of a differential delay shifter described herein are not described in the prior art because deployed antenna installations generally operate as frequency-division duplex (FDD). An FDD system may simultaneously transmit and receive signals, so non-linearities must be mitigated to control passive intermodulation (PIM). Since ohmic switch contacts may produce substantial non-linearities, and consequently unacceptably high PIM values, switch-based phase shifters have traditionally been implemented with capacitively-coupled sliders as described herein. Switch-based phase shifter architectures are thus not considered for antenna installations because of their non-linearities and incompatibility with FDD systems.

Because emerging cellular architectures (e.g., 5G systems) may utilize time-division duplex (TDD) communication, which does not simultaneously transmit and receive EM signals, the switch-based differential delay shifter embodiments described herein may have substantial utility for antenna down-tilt applications.

While example embodiments have been particularly shown and described, it will be understood by those skilled in the art that various changes in form and details may be made therein without departing from the scope of the embodiments encompassed by the appended claims.

What is claimed is:

1. A differential time delay shifter, comprising:
   a 1-to-N switch, where N is an integer greater than 1, the 1-to-N switch having a pole contact, N throw contacts, and a pole arm configured to selectively electrically couple the pole contact to zero or more of the N throw contacts, one of the N throw contacts being a first throw contact at a first position of the 1-to-N switch and another one of the N throw contacts being a last throw contact at a last position of the 1-to-N switch;
   one or more transmission lines, each of which is electrically connected between a respective two of the N throw contacts;
   a source configured to generate an electromagnetic (EM) signal, the source electrically coupled to the pole contact to convey the EM signal to the pole contact;
   one or more loads, a first of the one or more loads is electrically coupled to the first throw contact; and
   one or more matching components configured to match an impedance of one of the switch, the first one of the one or more loads, the source, and the one or more transmission lines, to an impedance of another of the switch, the first of the one or more loads, the source, and the one or more transmission lines.

2. The differential time delay shifter of claim 1, wherein a second of the one or more loads is electrically coupled to the last throw contact.

3. The differential time delay shifter of claim 2, wherein a switch position of the 1-to-N switch causes (i) the EM signal to propagate through M of the one or more transmission lines to the first load, and (ii) the EM signal to propagate through N-M of the one or more transmission lines to the second load, M being an integer greater than or equal to zero.

4. The differential time delay shifter of claim 3, wherein the M transmission lines are different from the N-M transmission lines.

5. The differential time delay shifter of claim 1, wherein the pole arm is configured to selectively electrically couple the pole contact to only one of the N throw contacts at a time.

6. The differential time delay shifter of claim 1, wherein the pole arm is configured to selectively electrically couple the pole contact to two or more of the N throw contacts simultaneously.

7. The differential time delay shifter of claim 1, wherein the pole arm is configured to selectively electrically couple the pole contact to (i) none of the N throw contacts, (ii) only one of the N throw contacts at a time, or (iii) two or more of the N throw contacts simultaneously.

8. A method of applying a time delay to an electromagnetic (EM) signal, comprising:
   configuring a 1-to-N switch, where N is an integer greater than 1, to have:
   (i) a pole contact;
   (ii) N throw contacts;
   (iii) a pole arm configured to selectively electrically couple the pole contact to a respective one of the N throw contacts, one of the N throw contacts being a first throw contact at a first position of the 1-to-N switch and an Nth one of the N throw contacts being a last throw contact at a last position of the 1-to-N switch;
   (iv) one or more transmission lines, each of which is electrically connected between a respective two of the N throw contacts;
   electrically coupling a source configured to generate the electromagnetic (EM) signal to the pole contact;
   electrically coupling a first load to the first throw contact;
   manipulating the pole arm to electrically couple the pole contact to the respective one of the N throw contacts; and
   one or more matching components configured to match an impedance of one of the switch, the first load, the source, and the one or more transmission lines, to an impedance of another of the switch, the first load, the source, and the one or more transmission lines.

9. The method of claim 8, further comprising selectively electrically coupling the pole contact to (i) none of the N throw contacts, (ii) only one of the N throw contacts at a time, or (iii) two or more of the N throw contacts simultaneously.

10. The method of claim 8, further comprising electrically coupling a second load to the last throw contact.

11. The method of claim 8, further comprising causing the EM signal to propagate through M of the one or more transmission lines to the first load, and causing the EM signal to propagate through N-M of the one or more transmission lines to a second load, M being an integer greater than or equal to zero.

12. The method of claim 8, further comprising selectively electrically coupling the pole contact to only one of the N throw contacts at a time.

13. The method of claim 8, further comprising selectively electrically coupling the pole contact to two or more of the N throw contacts simultaneously.

14. An antenna array feed system, comprising:
   an antenna array having at least one column of radiating elements;
   at least one delay shift network configured to distribute an electromagnetic (EM) signal to the antenna array, the at least one delay shift network comprising (i) at least one 1-to-N switch, and (ii) one or more transmission lines, each of which is electrically connected between a respective two of N throw contacts of the 1-to-N switch;
   each of the radiating elements of the antenna array being electrically coupled to a respective throw contact of the at least one 1-to-N switch, such that each radiating element is disposed at an end point of the one or more transmission lines; and
   one or more matching components configured to match an impedance of one of the at least one 1-to-N switch, a load, a source, and the one or more transmission lines, to an impedance of another of the at least one of the 1-to-N switch, one of the radiating elements of the antenna array, the source, and the one or more transmission lines.

15. The antenna array feed system of claim 14, wherein the at least one column of radiating elements comprises at least two columns of radiating elements, the at least one delay shift network configured to distribute the EM signal to radiating elements of the at least two columns such that the elements of each column experience different differential delay patterns.

16. The antenna array feed system of claim 14, wherein the at least one 1-to-N switch is configured to selectively electrically couple the EM signal to only one of the N throw contacts at a time.

17. The antenna array feed system of claim 14, wherein the at least one of the 1-to-N switch is configured to selectively electrically couple the EM signal to two or more of the N throw contacts simultaneously.

18. The antenna array feed system of claim 14, wherein the at least one of the 1-to-N switch is configured to selectively electrically couple the EM signal to (i) none of the N throw contacts, (ii) only one of the N throw contacts at a time, or (iii) two or more of the N throw contacts simultaneously.

19. The antenna array feed system of claim 14, wherein the at least one column of radiating elements comprises at least two columns of radiating elements, the at least one delay shift network configured to distribute the EM signal to radiating elements of the at least two columns such that the elements of each column experiences a same differential delay pattern.

* * * * *